April 22, 1969  I. M. BRANDON  3,439,722
NUT AND BOLT ASSEMBLY
Filed Aug. 15, 1966

IRA M. BRANDON
  INVENTOR.

BY Hayden & Pravel

ATTORNEYS

3,439,722
NUT AND BOLT ASSEMBLY
Ira M. Brandon, 5013 Fannin St.,
Houston, Tex. 77004
Filed Aug. 15, 1966, Ser. No. 574,516
Int. Cl. F16b *39/30, 39/28*
U.S. Cl. 151—14                              1 Claim

ABSTRACT OF THE DISCLOSURE

A nut and bolt assembly in which the nut is constructed of two pivotal sections with threads having a flat crest, and the threads being undercut and the bolt is provided with an undercut thread arrangement with pointed crests which tends to close the nut more tightly towards the center of the bolt as the nut is tightened hereon.

---

In the construction of all bolts and nuts using standard V-threads, there is tendency for the nut to spread open or burst under pressure. This is caused by the tendency of the threads to wedge the hollow nut open under pressure due to the camming action of the V-threads. There has been some attempt to provide a nut which may be mounted on the bolt in a position adjacent to its final clamping position but these devices have universally failed due to the necessity of the provision of some fastening device which is subject to extreme pressures and frequent failure due to outward forces encountered in the tightening operation.

Accordingly, it is the primary object of the present invention to provide a nut and bolt assembly with the nut having two pivotal sections having undercut threads thereon with the crests of the threads being flat and a thread arrangement on the bolt with pointed crests which locks the nut around the bolt with the locking action being increased by the tightening of the nut, with the construction and bearing surface of the threads between the nut and bolt being such that the bolt would normally be sheared by longitudinal force before the nut loses its effectiveness.

An object of the present invention is to provide a nut and bolt assembly which is extremely simple in construction, easy to use, adapted for many purposes, and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
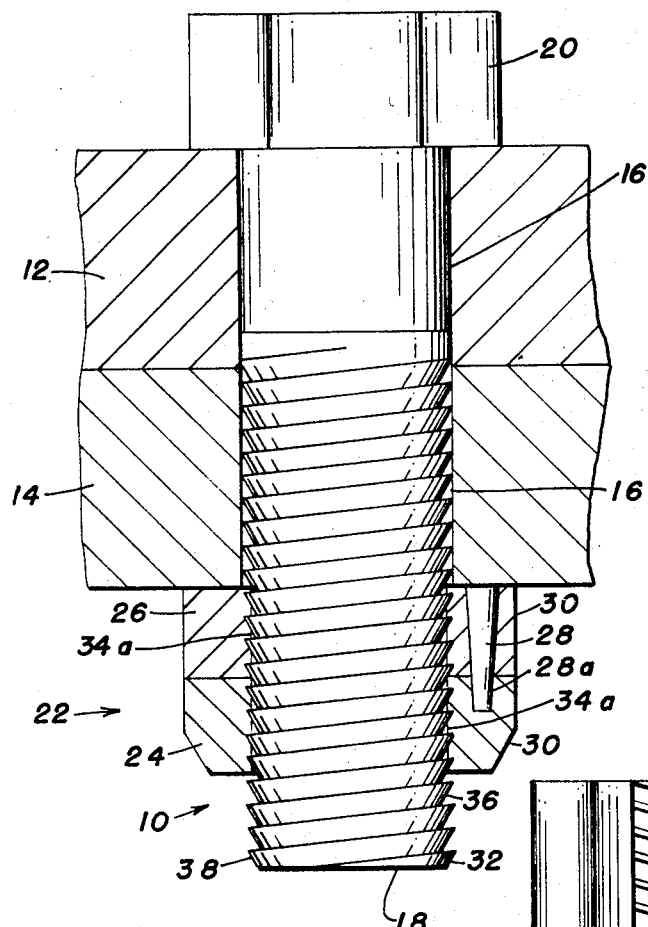
FIG. 1 is a side elevational view of the nut and bolt assembly with a portion of the nut being removed to better show the relationship between the threads on the nut and bolt.

Referring now specifically to the drawings, the numeral 10 generally designates the nut and bolt assembly of the present invention for securing two objects together such as the plates 12 and 14 which are provided with aligned bores 16 for receiving an elongated bolt shank 18 having a polygonal head 20 disposed on one end thereof for engagement with one surface of the plate 12. For engagement with the surface of the plate 14 there is provided a nut generally designated by numeral 22 and including a pair of sections 24 and 26 hingedly connected together by a hinge pin 28 which fits in opening 28a of the overlapping portions 30 formed on each half section 24 and 26. The outer surface of the nut 22 is provided with flattened portions forming a polygonal member for receiving a conventional turning tool such as a wrench. The sections 24 and 26 comprise a pair of complementary substantially semi-cylindrical sections, as shown in the drawings.

The bolt shank 18 is provided with a undercut spiral thread 32 thereon with each section 24 and 26 of the nut 22 also being provided with an internal spiral undercut thread 34 of the same construction for engagement therewith, however the crests of the undercut threads of each section 24 and 26 is flattened as illustrated at 34a.

Figure 4:
FIG. 4 is an enlarged detail view showing the threads on a portion of the shank of the bolt.
Figure 2:
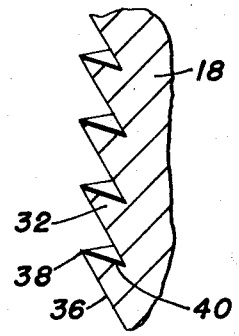
FIG. 2 is a view showing the two-half sections of the nut separated to better illustrate the thread arrangement thereon of the nut.
Figure 2:
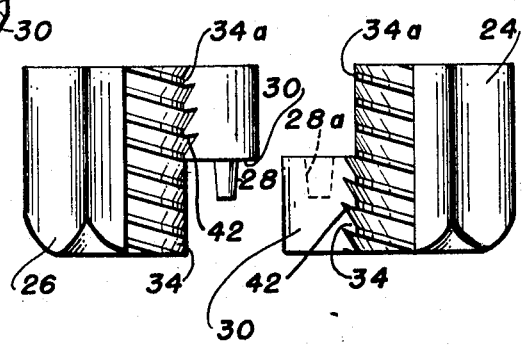
Figure 3:
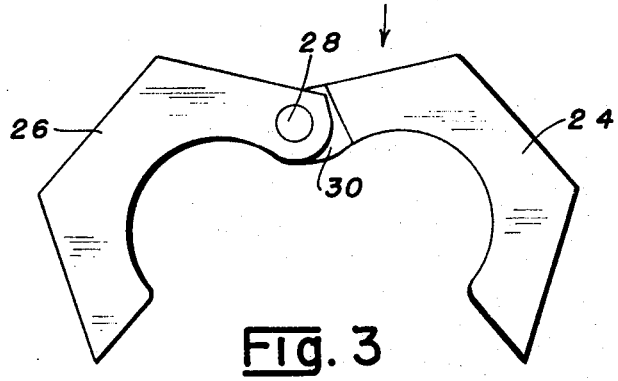
FIG. 3 is an end view of the nut in unfolded or disengaged position.

Referring specifically to FIGS. 1, 2 and 4, the threads 32 on shank 18 are formed by an upwardly and outwardly inclined portion 36 terminating at a pointed edge on crest 38 which in turn has extending therefrom an inwardly extending inclined surface 40 disposed in diverging relation to the surface 36 but still being inclined towards the outer end of the shank 18 for engagement with a similar surface 42 on the threads 34 on each section of the nut 22, however the crests of the threads 34 are flattened as shown at 34a, so that when the nut 22 is positioned on shank 18 as close to the surface that it is to abut as possible, rotation of the nut 22 will cause the surfaces 42 and 40 to be brought into engagement whereby the inclined nature of the surface 40 and its matching surface 42 along with the void created by the flattened crests 34a will cause the nut sections 24 and 26 to pivot inwardly or be pulled inwardly for more effective engagement with the threads on the bolt shank thus preventing the nut from becoming unloosened or removed from the bolt shank 18 until the nut is rotated for loosening. Thus, the present nut requires no fastening devices of any kind and is merely positioned on the bolt shank as close to the work as possible and is then turned to close and lock on the nut, whereby the nut and bolt will be closed together and are held in a locked position regardless of vibration or shock. The undercut on the threads 32 and 34 should preferably be at least one degree or more.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed is:
1. A quick acting nut and bolt assembly comprising:
    (a) a bolt shank having a headed end and a shank of constant cross-sectional area;
    (b) a spiral external thread on said shank;
    (c) the trailing flank of said thread throughout its axial extent being inclined so as to define undercut surfaces with respect to the leading flank thereof, said thread having pointed crests and pointed roots with said pointed roots lying in the undercut;
    (d) a nut removably mounted on said shank;
    (e) said nut including a pair of complementary substantially semi-cylindrical sections;
    (f) each of said sections having a portion overlapping the other of said sections;
    (g) a pin in one of said overlapping portions and there being an opening at least partially through the other of said portions for receiving said pin, whereby said sections may be pivotally connected together the other ends of said sections being unconnected;
    (h) said sections each being internally threaded to conform with the inclined, undercut threads on said shank; and

(i) said thread on each section each having a crest which is flat to provide a void between the undercut root portions of the thread on said shank and the crests of the thread on said nut sections when engaged whereby the locking action between the nut and bolt shank is increased by tightening of the nut.

References Cited

UNITED STATES PATENTS

| | | | |
|---|---|---|---|
| 1,375,782 | 4/1921 | De Long | 85—33 |
| 1,421,638 | 7/1922 | Wheeler | 85—32 |
| 1,510,492 | 10/1924 | Caron et al. | 85—33 |
| 1,657,244 | 1/1928 | Dardelet | 151—19 |
| 1,887,963 | 11/1932 | Stafford | 85—33 |
| 2,005,348 | 6/1935 | Mitchell | 85—32 |
| 122,243 | 12/1871 | Flower | 85—33 |
| 154,864 | 9/1874 | Harvey | 151—14 |
| 197,466 | 11/1877 | Harvey | 151—22 |
| 197,473 | 11/1877 | James | 85—33 |
| 204,036 | 5/1878 | Harvey | 151—22 |
| 277,408 | 5/1883 | Carleton | 151—14 |
| 663,208 | 12/1900 | Wrensch | 85—33 |
| 671,274 | 4/1901 | Fischer | 85—1 |
| 781,571 | 1/1905 | Thomas | 85—33 |
| 797,925 | 8/1905 | Thomas | 85—33 |
| 909,118 | 1/1909 | Richards et al. | 151—14 |

FOREIGN PATENTS 622,815   5/1949   Great Britain.

CARL W. TOMLIN, *Primary Examiner.*

R. S. BRITTS, *Assistant Examiner.*

U.S. Cl. X.R.

85—33; 151—19